US011731365B2

(12) United States Patent
Brown

(10) Patent No.: US 11,731,365 B2
(45) Date of Patent: Aug. 22, 2023

(54) CALIBRATION METHOD OF PLURALITY OF SCANNERS IN AN ADDITIVE MANUFACTURING APPARATUS

(71) Applicant: RENISHAW PLC, Wotton-under-Edge (GB)

(72) Inventor: Ceri Brown, Plaisance-du-Touch (FR)

(73) Assignee: RENISHAW PLC, Wotton-under-Edge (GB)

( * ) Notice: Subject to any disclaimer, the term of this patent is extended or adjusted under 35 U.S.C. 154(b) by 596 days.

(21) Appl. No.: 16/093,558

(22) PCT Filed: Apr. 25, 2017

(86) PCT No.: PCT/GB2017/051137
§ 371 (c)(1),
(2) Date: Oct. 12, 2018

(87) PCT Pub. No.: WO2017/187147
PCT Pub. Date: Nov. 2, 2017

(65) Prior Publication Data
US 2019/0118481 A1    Apr. 25, 2019

(30) Foreign Application Priority Data
Apr. 25, 2016 (GB) ..................... 1607152

(51) Int. Cl.
*B29C 64/393*      (2017.01)
*B33Y 10/00*       (2015.01)
(Continued)

(52) U.S. Cl.
CPC ............ *B29C 64/393* (2017.08); *B22F 10/28* (2021.01); *B22F 10/31* (2021.01); *B22F 10/366* (2021.01);
(Continued)

(58) Field of Classification Search
CPC ..... B29C 64/393; B29C 64/20; B29C 64/153; B22F 12/00; B22F 10/10; B22F 10/30;
(Continued)

(56) References Cited

U.S. PATENT DOCUMENTS 5,832,415 A   11/1998   Wilkening et al.
6,483,596 B1  11/2002   Philippi et al.
(Continued)

FOREIGN PATENT DOCUMENTS

CN      104433023 A   3/2015
DE      29824994 U1   1/2004
(Continued)

OTHER PUBLICATIONS

Nov. 11, 2016 Search Report issued in British Patent Application No. 1607152.4.
(Continued)

*Primary Examiner* — Thomas C Lee
*Assistant Examiner* — Charles Cai
(74) *Attorney, Agent, or Firm* — Oliff PLC

(57) ABSTRACT

A method for determining an attribute of an additive manufacturing apparatus including a plurality of scanners, each scanner including beam steering optics for directing a corresponding radiation beam to a working plane in which material consolidated in layers. The method may include controlling the beam steering optics of a pair of the scanners wherein a first scanner of the pair directs a radiation beam to form a feature in the working plane. The feature is within a field of view of a detector of the second scanner of the pair, the detecting radiation from the working plane is collected by the beam steering optics of the second scanner. Further including recording at least one detector value with the detector of the second scanner for the field of view and determining an attribute of the additive manufacturing appa-
(Continued)

ratus from a comparison of the detector value with an expected detector value.

28 Claims, 5 Drawing Sheets

(51) Int. Cl.
*B33Y 50/02* (2015.01)
*B33Y 30/00* (2015.01)
*B29C 64/153* (2017.01)
*B29C 64/20* (2017.01)
*B22F 10/28* (2021.01)
*B22F 12/45* (2021.01)
*B22F 12/49* (2021.01)
*B22F 12/90* (2021.01)
*B22F 10/31* (2021.01)
*B22F 10/366* (2021.01)

(52) U.S. Cl.
CPC .............. *B22F 12/45* (2021.01); *B22F 12/49* (2021.01); *B22F 12/90* (2021.01); *B29C 64/153* (2017.08); *B29C 64/20* (2017.08); *B33Y 10/00* (2014.12); *B33Y 30/00* (2014.12); *B33Y 50/02* (2014.12); *Y02P 10/25* (2015.11)

(58) Field of Classification Search
CPC ......... B22F 10/20; B33Y 30/00; B33Y 10/00; B33Y 50/02; Y02P 10/25
See application file for complete search history.

(56) References Cited

U.S. PATENT DOCUMENTS

| | | |
|---|---|---|
| 6,768,562 B1 | 7/2004 | Takada et al. |
| 7,867,431 B2 | 1/2011 | Higashi et al. |
| 9,114,478 B2 | 8/2015 | Scott et al. |
| 10,518,555 B2 | 12/2019 | Conrads et al. |
| 2009/0206065 A1 | 8/2009 | Kruth et al. |
| 2009/0300573 A1 | 12/2009 | Cao et al. |
| 2015/0375456 A1* | 12/2015 | Cheverton ............ B29C 64/393 264/406 |
| 2016/0082668 A1* | 3/2016 | Perret .................... B22F 10/20 264/406 |
| 2017/0090462 A1* | 3/2017 | Dave ...................... B33Y 30/00 |
| 2017/0203517 A1* | 7/2017 | Crear ..................... B22F 10/20 |
| 2018/0036949 A1* | 2/2018 | Lopez ................... B29C 64/112 |
| 2018/0370146 A1* | 12/2018 | Domrose .............. B33Y 10/00 |

FOREIGN PATENT DOCUMENTS

| | | |
|---|---|---|
| EP | 1 046 941 A1 | 10/2000 |
| EP | 1 752 240 A1 | 2/2007 |
| EP | 2 028 546 A2 | 2/2009 |
| EP | 2 186 625 A2 | 5/2010 |
| WO | 94/15265 A1 | 7/1994 |
| WO | 2007/147221 A1 | 12/2007 |
| WO | 2010/007396 A1 | 1/2010 |
| WO | 2010/026397 A1 | 3/2010 |
| WO | 2014/180971 A1 | 11/2014 |
| WO | 2014/199134 A1 | 12/2014 |
| WO | 2015/083104 A1 | 6/2015 |
| WO | 2015/091485 A1 | 6/2015 |
| WO | 2017/158327 A1 | 9/2017 |
| WO | 2017/174226 A1 | 10/2017 |

OTHER PUBLICATIONS

Jul. 24, 2017 International Search Report issued in International Patent Application No. PCT/GB2017/051137.

Jul. 24, 2017 Written Opinion of the International Searching Authority issued in International Patent Application No. PCT/GB2017/051137.

* cited by examiner

CALIBRATION METHOD OF PLURALITY OF SCANNERS IN AN ADDITIVE MANUFACTURING APPARATUS

FIELD OF INVENTION

This invention concerns a method and apparatus for carrying out measurements in an additive manufacturing apparatus comprising multiple scanners, each scanner for directing a radiation beam to a working plane. In particular, but not exclusively, the invention concerns a method for calibrating scanners of an additive manufacturing apparatus comprising a material bed (e.g. powder or resin bed).

BACKGROUND

Additive manufacturing or rapid prototyping methods for producing parts comprise layer-by-layer solidification of a material. There are various additive manufacturing methods, including powder bed systems, such as selective laser melting (SLM), selective laser sintering (SLS), electron beam melting (eBeam), resin bath based systems, such as stereolithography, and non-powder bed systems, such as fused deposition modelling, including wire arc additive manufacturing (WAAM).

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required.

To form a workpiece accurately the scanner has to be calibrated.

WO94/15265 discloses placing a Mylar sheet with a large number of square cells printed thereon on a target surface and marking each cell with the laser beam. The sheet is then converted into digital form by scanning with a conventional digital scanner and the location of the laser mark relative to the centroid of the cell is used to update the correction factors for that cell. Such a calibration is carried out periodically.

U.S. Pat. No. 5,832,415 discloses a method for calibrating the deflection control of a laser beam for a rapid prototyping system. A light-sensitive medium is exposed to a laser beam at predetermined positions for generating a test pattern. A video camera is progressively moved across the produced test pattern so as to produce corresponding pattern portions of the test pattern with the camera. An evaluation program is used for composing the digitized pattern portions to an overall pattern. The picture coordinates of the overall pattern are compared with the digitized coordinates of a photomechanically produced reference pattern. A correction table required for control of the scanner for deflecting the laser beam is modified on the basis of the comparison.

U.S. Pat. No. 6,483,596 discloses a method for calibrating the control of a radiation device in a rapid prototyping system, wherein a calibration plate is arranged at a defined position in the rapid prototyping system. The calibration plate has an upper side with a first region and second region separate from the first region. The first region is provided with optically detectable reference crosses and the second region has a medium which is sensitive to the radiation of the radiation device. A test pattern of crosses is produced by exposing the medium to the radiation at predetermined desired positions defined by position coordinate data. The first and second regions are digitised, for example by means of a pixel scanner, a video camera or a digital camera, and correction data is calculated from comparing the reference crosses and crosses of the test pattern.

EP2186625 discloses a method to correct for geometric distortion of digital light projectors used in a rapid prototyping system. A camera is used to view an uncompensated test pattern created by each digital light projector. Each uncompensated test pattern is compared with the ideal test pattern to generate a pattern correction map.

WO2014/180971 discloses a method of automatic calibration of a device for generative production of a three-dimensional workpiece comprising first and second scanners. On an applied layer of material or a target, a first test pattern is produced using the first scanner and a second test pattern is produced using the second scanner. The first and second test patterns may be a specific grating pattern with a specific lattice constant or a dot pattern. A calibrated camera is used to capture an image of the first and second test patterns and compare the first and second test patterns to a reference pattern stored in memory of a control device. The first and second scanners are calibrated such that deviations of the corresponding test patterns from the reference pattern fall below a desired value. The calibration method may comprise an auto-correlation method or matching method.

It is desirable to provide a method of calibrating scanners of a multi-beam additive manufacturing apparatus in an automated manner. It is desirable to provide a method for calibrating the scanners for thermal drift that may occur during the build.

SUMMARY OF INVENTION

According to a first aspect of the invention there is provided a method for determining an attribute of an additive manufacturing apparatus comprising a plurality of scanners, each scanner of the plurality of scanners comprising beam steering optics for directing a corresponding radiation beam to a working plane in which material is consolidated in layers, the method comprising controlling the beam steering optics of a pair of the scanners such that a first scanner of the pair directs a radiation beam to form a feature in the working plane and the feature is within a field of view of a detector of the second scanner of the pair, the detector for detecting radiation coming from the working plane that is collected by the beam steering optics of the second scanner, recording at least one detector value with the detector of the second scanner for the field of view and determining an attribute of the additive manufacturing apparatus from a comparison of the detector value with an expected detector value as determined from a positioning of the steering optics of the first scanner of the pair when forming the feature.

The feature may be a radiation profile, such as laser spot, or a melt pool formed by the radiation beam in the working plane. The feature may be a feature formed by ablating material of a surface in the working plane or consolidating material at the working plane using the radiation beam. The feature may be a reference pattern formed on a surface in the working plane within the field of view using the radiation beam directed by the first scanner. The radiation beam may be structured light directed onto a surface in the working plane by the first scanner.

According to a second aspect of the invention there is provided a method for determining an attribute of an additive manufacturing apparatus comprising a plurality of scanners, each scanner comprising beam steering optics for directing a corresponding radiation beam to a working plane in which material is consolidated in layers and a detector for detecting radiation coming from the working plane that is collected by the beam steering optics, the method comprising controlling the beam steering optics of first and second scanners of a pair of the scanners such that fields of view of the working plane for the detectors of the first and second scanners at least overlap, and preferably are nominally coterminous, recording at least one detector value with the detector of each of the first and second scanners for the corresponding field of view and determining an attribute of the additive manufacturing apparatus from a comparison of the detector values recorded by the first and second scanners.

The method of the second aspect may comprise: recording detector values when a radiation beam is directed onto material in the working plane within the fields of view by one of the plurality of scanners and/or recording detector values generated by a feature, such as a reference pattern, located in the working plane in the fields of view.

The feature may be formed on a surface in the working plane using one of the radiation beams. The feature may be formed by ablating material and/or consolidating material in the working plane. The feature may be formed by the projection of detectable radiation, such as a structured light pattern on to material in the working plane. The projection of detectable radiation may comprise a first structured light pattern of a first wavelength in a first orientation and a second structured light pattern of a second, different wavelength oriented in a second, different direction. The first and second scanners may comprise a detector capable of detecting both the first wavelength and second wavelength of light.

The method may comprise placing a reference artefact comprising the reference pattern in the additive manufacturing apparatus such that the reference pattern is located in the working plane within the fields of view.

In this way, an attribute of the additive manufacturing apparatus can be determined by cross-referencing data from the two scanners of the pair. For example, the data may be cross-referenced to calibrate one of the scanners relative to the other scanner. The attribute may be an attribute of the scanners, such as a difference in a measured position or size of: a spot of the radiation beam, a feature formed by the radiation beam and/or field(s) of view in the working plane as determined from the detector value(s) from a nominal value. Alternatively, the data may be cross-referenced, for example using triangulation, to determine an attribute of material/a surface in the working plane, such as a height/position of solidified or unsolidified material in the field of view, a location of a build substrate/build platform or a location of a preformed part to be built on using the additive manufacturing process.

The method may comprise adjusting the additive manufacturing apparatus to correct for a difference in the attribute from the nominal value. For example, a correction value, function or map may be determined for correcting at least one position of the steering optics of one of the scanners of the pair based upon the difference in the attribute from the nominal value. The correction value, function or map may be based upon a measured position in the working plane of the radiation beam or a feature generated by the radiation beam, as derived from the detector value, relative to a nominal position. The correction value, function or map may be based upon a measured relative position of the fields of view, as derived from the detector values, compared to a nominal position.

The additive manufacturing apparatus may comprise more than two scanners and the method comprises carrying out the method for multiple pairs of the more than two scanners to generate a correction value, function or map for one of the scanners of each pair such that the more than two scanners are aligned to a common frame of reference.

The method may comprise calibrating the steering optics of a first one of the plurality of scanners to provide a first calibrated scanner and generating the correction value, function or map for one or more of the other scanners of the plurality of scanners (in a method described above) to align positioning of the steering optics of the one or more scanners with the first calibrated scanner. The first calibrated scanner may be calibrated using a different method, for example using the method described in unpublished GB patent application no: 1604728.4, which is incorporated herein by reference.

The detector may comprise a position sensitive device (PSD) that can measure a variation in intensity of the radiation across the field of view in one or, preferably, two dimensions. The PSD may comprise an isotropic sensor or a two-dimensional array of discrete elements sensitive to the radiation, such as a charge coupled device (CCD) or complementary metal-oxide-semiconductor device (CMOS). The comparison may comprise a comparison of a radiation intensity across the PSD of the second scanner to an expected position or a radiation intensity across the PSD of the first scanner.

The method may comprise directing the radiation beam with the first scanner of the pair across material in the working plane to form a melt pool, determining from the detector value on the PSD of the second scanner a position of the melt pool in a field of view of the second scanner and generating the correction value, function or map for the first or second scanner based upon the position of the melt pool in the field of view. The melt pool provides a distinctive feature that can be easily distinguished from the surrounding unmelted material and emits radiation of a different wavelength from the wavelength of light of the radiation beam. Accordingly, a filter can be used to separate the radiation emitted from the melt pool from back-reflected light of the radiation beam such that the back-reflected light is not incident on the detector. Use of the melt pool as a feature on which to base a correction of the scanner may allow correction of the scanner during the build, for example, to correct for drifting in the position of a radiation beam directed by the scanner due to thermal effects as the temperature of the scanner changes. At the start of a build a scanner may be relatively cool but may heat up as a radiation beam, such as a high power laser beam, is passed therethrough to melt material in the working plane.

The method may comprise determining from the detector value on the PSD of the second scanner a position of the feature in a field of view of the second scanner and generating the correction value, function or map for the first or second scanner based upon the position of the feature in the field of view.

The reference pattern may comprise at least one periodic feature, capturing an image of the reference pattern with the detector of the second scanner, the method comprising determining from the image a measured periodic property of the reference pattern and determining the correction value, function or map for control of the first or second scanner based upon a comparison of the measured periodic property with a reference periodic property. The reference periodic property may be determined from the instructions used to drive the other scanner of the pair when forming the reference pattern or an image of the reference pattern captured by the detector of the other scanner of the pair.

By basing the correction on the periodic property of the reference pattern more accurate correction data can be determined. In particular, the periodic property may be determined with more accuracy than a position of a geometric feature or melt pool because the periodic property is based upon information determined from multiple geometric features (e.g. information averaged across multiple ones of the geometric features) rather than being dependent on a resolution of a single one of the geometric features on the detector.

The periodic property may be a measured phase shift of the reference pattern relative to a reference phase or a phase measured from the detector of the other scanner of the pair. A phase of the reference pattern may by indicative of an error in position of the radiation beam when forming the reference pattern and/or an error in positioning the field of view and the correction value, function or map may be determined from the phase shift to correct the positioning of the steering optics of the first or second scanner.

The phase shift may be determined through Fourier analysis of the image. The phase shift may be determined by carrying out a discrete Fourier transform of the image of the reference pattern at a reference frequency and determining the phase shift of a resultant frequency component from the reference phase. A value for the phase shift may be determined for each of a plurality of different positions of the field of view relative to the reference pattern.

The reference pattern may comprise a first pattern comprising a first geometric feature repeated in a first direction and a second pattern comprising a second geometric feature repeated in a second direction, perpendicular to the first direction. The first and second geometric features may be the same (but rotated to the corresponding first and second direction) or different. Each of the first and second directions may correspond to a spatial direction in which the radiation beam is moved by a different steering optics of the scanner. The first pattern and second pattern may be interspersed without overlap between the geometric features of each pattern.

The reference pattern may comprise a series of parallel lines. The reference pattern may comprise at least one first set of parallel lines that repeat in the first direction and at least one second set of parallel lines that repeat in the second direction. First sets of parallel lines may alternate with parallel lines of the second set across the working plane in both the first and second directions.

According to a third aspect of the invention there is provided a controller for controlling an additive manufacturing apparatus, wherein the controller is arranged to carry out the method of the first or second aspects of the invention.

According to a fourth aspect of the invention there is provided an additive manufacturing apparatus for building up a workpiece in a layer-by-layer manner comprising a plurality of scanners, each scanner for directing a radiation beam to consolidate material in a working plane and a controller according to the third aspect of the invention.

According to a fifth aspect of the invention there is provided a data carrier having instructions thereon, which, when executed by a controller for controlling an additive manufacturing apparatus, cause the controller to carry out the method of the first or second aspect of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray(™) disc, a memory (such as a Memory Stick(™), an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a sixth aspect of the invention there is provided a method for determining an attribute of an additive manufacturing apparatus comprising a plurality of scanners, each scanner of the plurality of scanners comprising positioning elements for directing an energy source to a working surface to consolidate material thereon, the method comprising controlling the positioning elements of a pair of the scanners such that a first scanner of the pair directs the corresponding energy source onto the working surface within a field of view of a detector of a second scanner of the pair, the detector for detecting radiation coming from the working surface and arranged to be positioned relative to the working surface using the positioning elements of the second scanner that are used to position the energy source, recording at least one detector value with the detector of the second scanner for the field of view and determining an attribute of the additive manufacturing apparatus from a comparison of the detector value with an expected detector value as determined from a positioning of the energy source by the first scanner of the pair.

The energy source may be a plasma arc and the scanner a deposition head of a wire-arc additive manufacturing apparatus. The positioning elements may comprise a robot or gantry system for positioning the deposition head relative to the working surface.

According to a seventh aspect of the invention there is provided a controller for controlling an additive manufacturing apparatus, wherein the controller is arranged to carry out the method of the sixth aspect of the invention.

According to a eighth aspect of the invention there is provided an additive manufacturing apparatus for building up a workpiece in a layer-by-layer manner comprising a plurality of scanners, each scanner for directing an energy source to consolidate material on a working surface and a controller according to the seventh aspect of the invention.

According to an ninth aspect of the invention there is provided a data carrier having instructions thereon, which, when executed by a controller for controlling an additive manufacturing apparatus, cause the controller to carry out the method of the sixth aspect of the invention.

DESCRIPTION OF EMBODIMENTS

Figure 1:
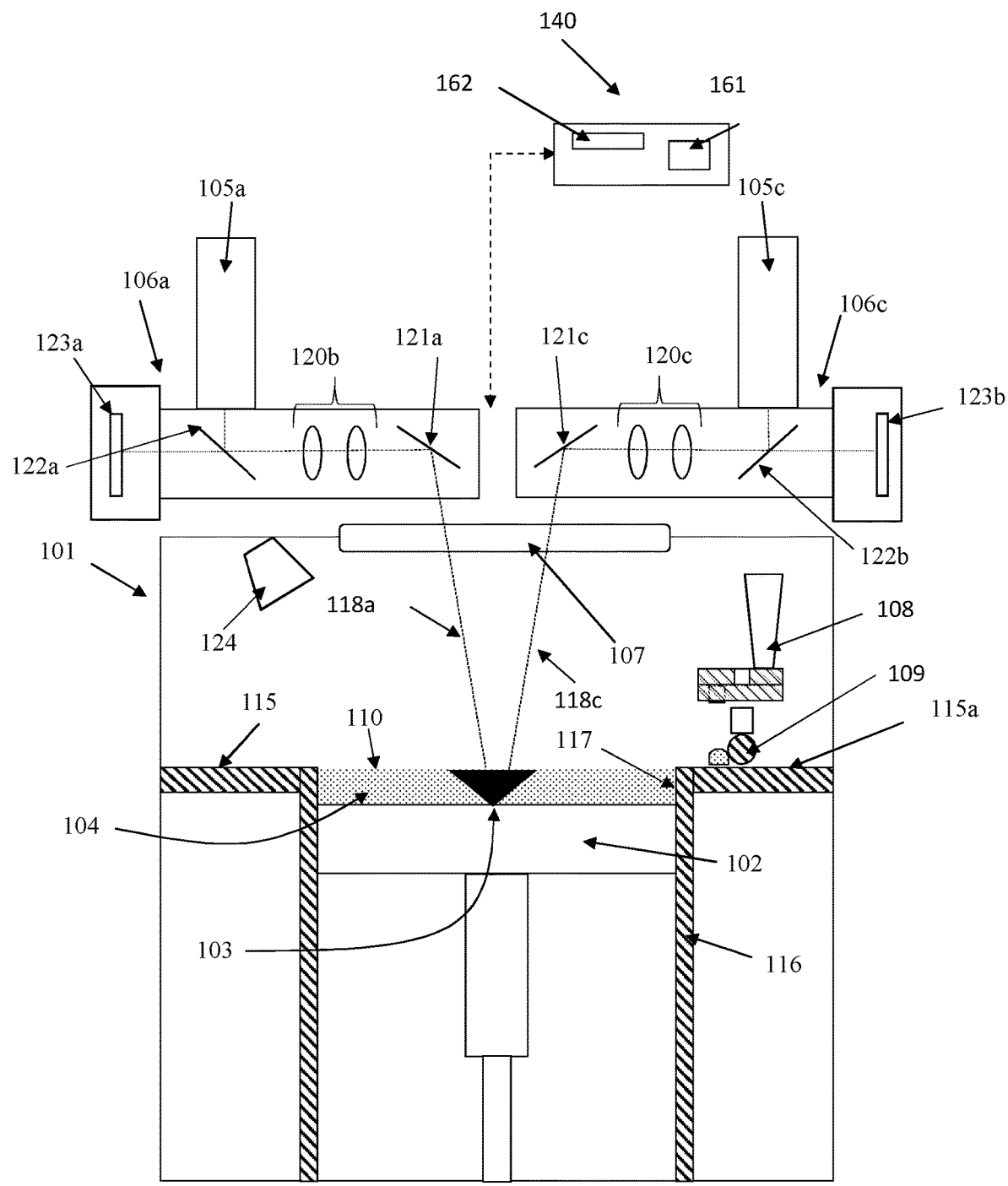
FIG. 1 shows an additive manufacturing apparatus according to an embodiment of the invention.
Figure 2:
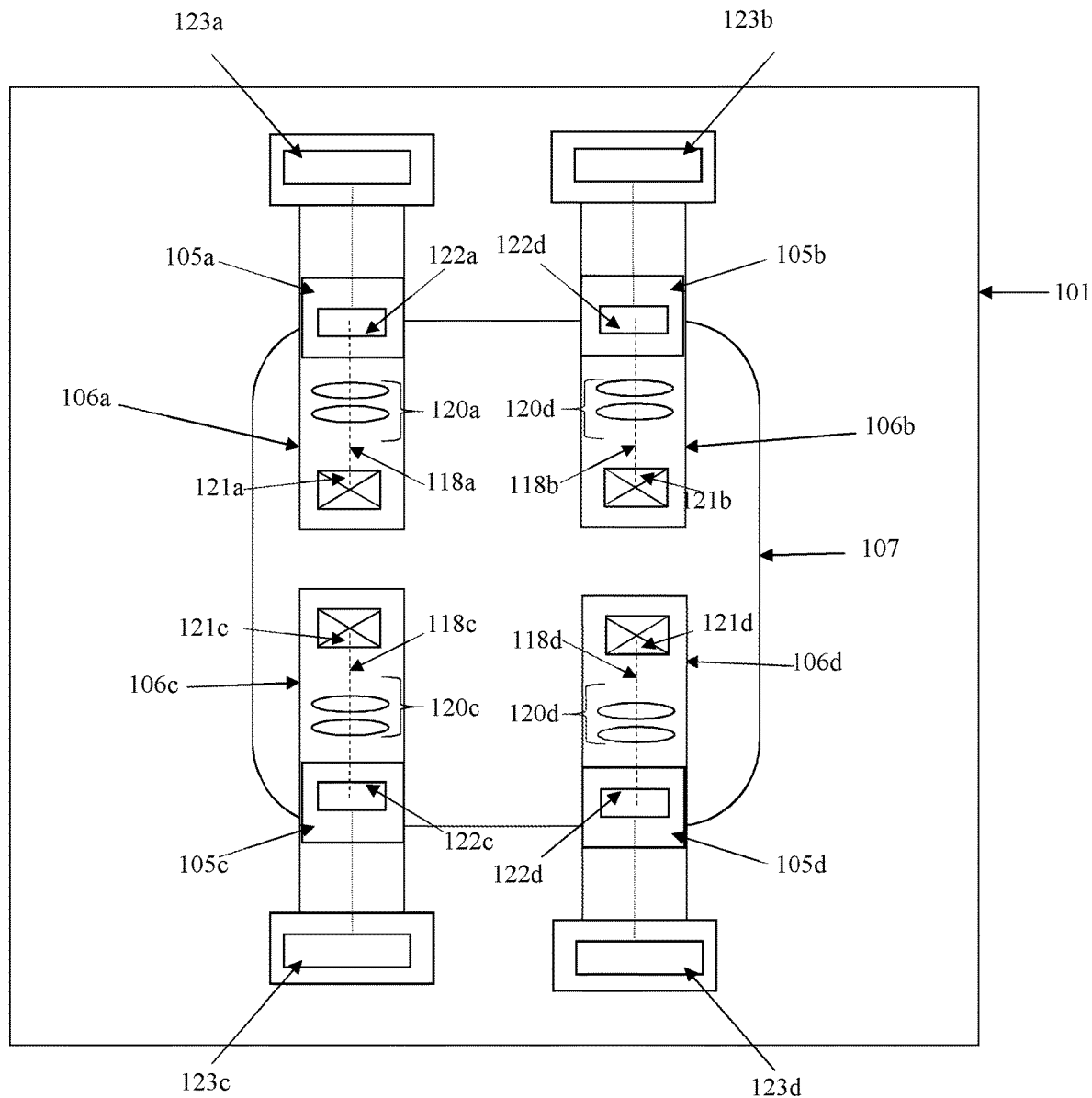
FIG. 2 is a plan view of the additive manufacturing apparatus shown in FIG. 1.

Referring to FIGS. 1 and 2, an additive manufacturing apparatus according to an embodiment of the invention comprises a build chamber 101 having therein partitions 115, 116 that define a build volume 117. A build platform 102 is lowerable in the build volume 117. The build platform 102 supports a powder bed 104 and workpiece 103 as the workpiece is built by selective laser melting of the powder. The platform 102 is lowered within the build volume 117 under the control of a motor as successive layers of the workpiece 103 are formed.

Layers of powder 104 are formed as the workpiece 103 is built by dispensing apparatus 108 and a wiper 109. For example, the dispensing apparatus 108 may be apparatus as described in WO2010/007396. The dispensing apparatus 108 dispenses powder onto an upper surface 115a defined by partition 115 and is spread across the powder bed by wiper 109. A position of a lower edge of the wiper 109 defines a working plane 110 at which powder is consolidated.

A plurality of laser modules 105a, 105b, 105c and 105d generate laser beams 118a, 118b, 118c, 118d for melting the powder 104, the laser beams 118a, 118b, 118c, 188d directed as required by a corresponding optical module 106a, 106b, 106c, 106d. The laser beams 118a, 118b, 118c, 118d enter through a common laser window 107. Each optical module comprises steering optics 121, such a two mirrors mounted on galvanometers, for steering the laser beam 118 in perpendicular directions across the working plane and focusing optics 120, such as two movable lenses for changing the focus of the laser beam 118. The scanner is controlled such that the focal position of the laser beam 118 remains in the same plane as the laser beam 118 is moved across the working plane. Rather than maintaining the focal position of the laser beam in a plane using dynamic focusing elements, an f-theta lens may be used.

Each optical module 106a, 106b, 106c, 106d comprises a beam splitter 122 which reflects the laser beam 118 and transmits wavelengths of radiation coming from the working plane of the powder bed 104. The beam splitter 122 may be arranged to transmit wavelengths that differ from a wavelength of the laser beam. The radiation that passes through the beam splitter 122 is imaged by a detector 123 in the form of a two-dimensional array of photodetector elements. The optical system may comprise further filters for filtering out wavelengths that are not of interest before the radiation is incident on the detector 123. For example, only visible light may be of interest or light in the infrared spectrum that arises from thermal emissions from the bed 104/melt pool.

Suitable lighting (not shown) may be provided for illuminating the working plane 110 of the powder bed 104.

A controller 140, comprising processor 161 and memory 162, is in communication with modules of the additive manufacturing apparatus, namely the laser modules 105a, 105b, 105c, 105d, optical modules 106a, 106b, 16c, 106d, build platform 102, dispensing apparatus 108, wiper 109 and detectors 123a, 123b, 123c, 123d. The controller 140 controls the modules based upon software stored in memory 162 as described below.

Figure 3:
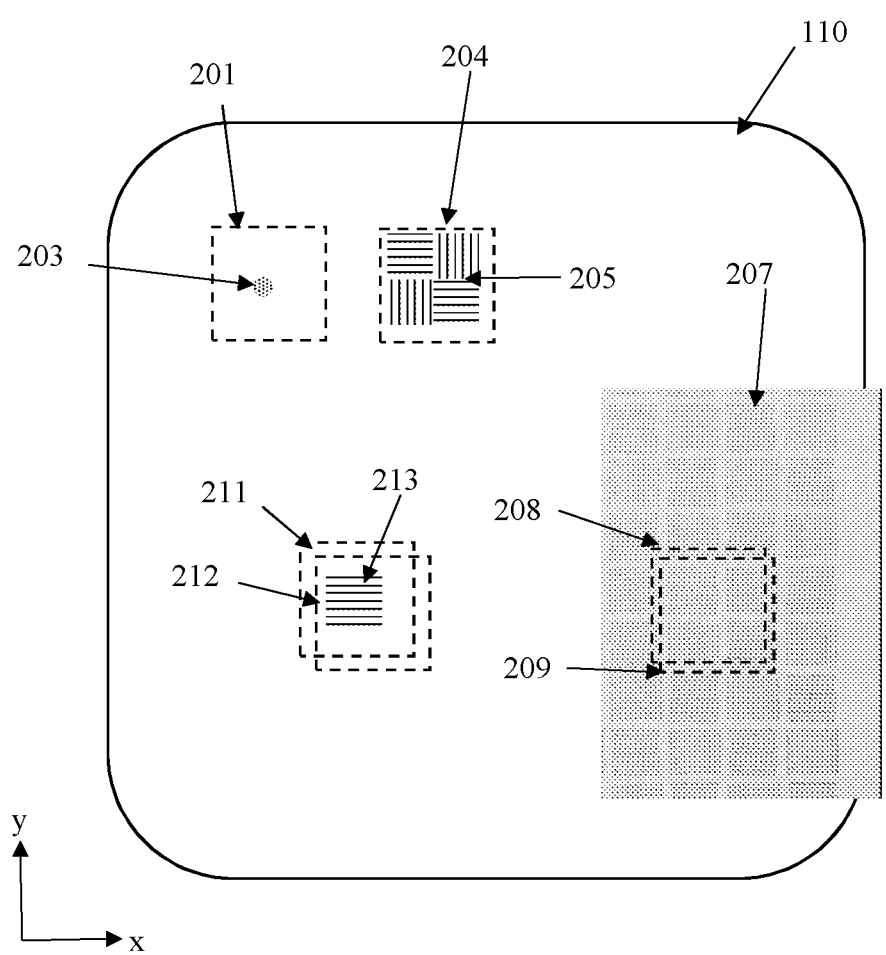
FIG. 3 shows embodiments for capturing data relating to a pair of scanners of the additive manufacturing apparatus according to the invention.
Figure 4:
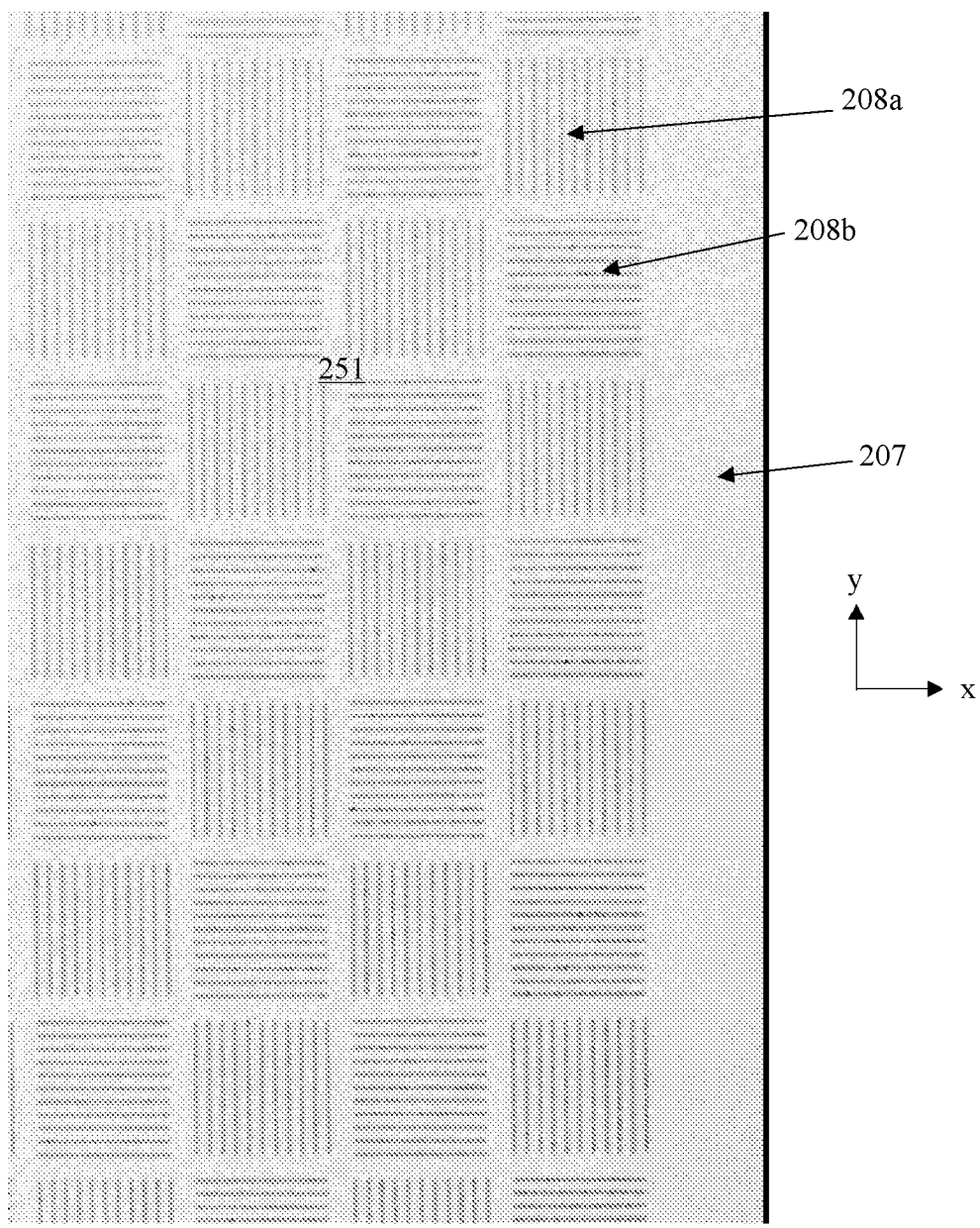
FIG. 4 is a reference pattern according to an embodiment of the invention for calibrating steering optics of the scanners.

Referring to FIGS. 3 and 4, a first one of the optical modules 106 may be calibrated using known methods or, for example, the method as described in GB1604728.4, which is incorporated herein by reference. Calibration of the remaining plurality of optical modules 106 is then carried out through comparison against the optical module 106 that has already been calibrated. FIG. 3 illustrates four ways in which this may be done.

In the first method, a calibrated one of the optical modules 106 directs its corresponding laser beam 118 to a defined x,y position on the working plane 110 to form a melt pool 203. At least one, and possibly all, of the uncalibrated optical modules 106 is/are directed to the same position. In this way, the melt pool 203 is within a field of view 201 of the or each detector 123 of the uncalibrated module(s). As the calibrated and uncalibrated optical modules are nominally directed to the same position, if the optical modules 106 were aligned, the melt pool 203 should appear in the centre of the field of view. However, if there is a misalignment between the optical modules 106, the melt pool 203 may appear off-centre.

An image of the melt pool 203 is captured on the detector 123 of the or each uncalibrated optical module 106 and a representative signal is sent to controller 140. The controller 140 determines a location of the centre of the melt pool 203 on the two-dimensional array of the detector 123 and determines a correction value to correct for misalignment of the calibrated and uncalibrated optical modules 106. This process may be repeated for multiple locations across the working plane 110 to build up a correction map or determine a correction function from which corrections in positions of the steering optics 121 for different positions of the laser beam 118 on the working plane 110 can be determined.

The process may be carried out before and/or during a build. In particular, the relative positional accuracy of the optical modules 106 may drift during the build because of the heating (possibly differential heating) of the optical modules 106. Adjustments made during the build can correct for this thermal drift during the build.

In a further embodiment, the calibrated optical module 106 is used to form a feature on the working plane 110, for example by ablating the surface of a substrate in the working plane or building the substrate by solidifying powder. In this embodiment, the feature comprises a reference pattern 205 comprising multiple squares of equally spaced parallel lines, some of the squares having lines spaced in the x-direction and the other ones of the squares having lines spaced in the y-direction. The uncalibrated optical module 106 is located such that a field of view 204 encompasses the reference pattern 205 and is nominally centred at the centre of the reference pattern 205. The image of the reference pattern 205 as recorded on the detector 123 of the uncalibrated optical module 106 and is used to determine an actual position of the field of view relative to the nominal position. A correction value is determined for the uncalibrated optical module 106 based upon the difference between the actual and nominal position and, as before, a correction map or function may be determined based upon correction values determined for multiple locations on the working plane 110.

The position of the reference pattern in the field of view may be determined by carrying out a discrete Fourier transforms (DFT) of the image of the reference pattern 205 at a known reference frequency of the parallel lines in the reference pattern 205. In this embodiment, the DFT is carried out by multiplying the image of the reference pattern recorded on the detector 123 by digitally generated sine and cosine representations centred at a midpoint of the image from the detector 123. A phase of the reference pattern in the image is determined for each region of parallel lines. For regions having a pattern with a feature that recurs in the x-direction, a phase shift in the x-direction is determined and, for regions having a pattern with a feature that recurs in the y-direction, a phase shift in the y-direction is determined.

The phase shift is determined from the arctan of the quotient of the two values obtained by multiplying the image by the sine and cosine representations.

The phase shifts in x and y provide correction values for aligning the uncalibrated optical module with the calibrated optical module.

Figure 5:
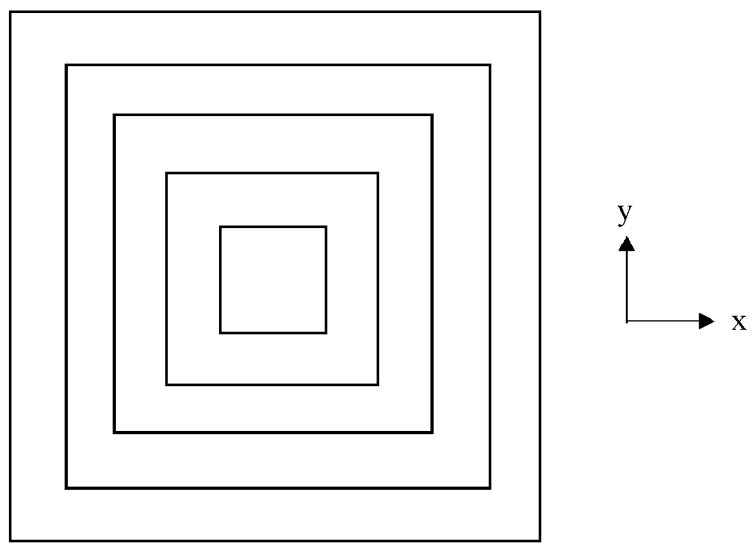
FIG. 5 is a reference pattern according to another embodiment of the invention.

FIG. 5 shows an alternative reference pattern, comprising interconnected periodic features in both x and y.

In a further embodiment, a reference artefact 207 having a reference pattern thereon is placed in the additive manufacturing apparatus to locate the reference pattern in the working plane 110. The reference pattern comprising multiple regions, in this embodiment squares 208a, 208b, of equally spaced parallel lines, some of the squares 208a having lines spaced in the x-direction and the other ones of the squares 208b having lines spaced in the y-direction. The calibrated optical module 106 and an uncalibrated optical module 106 are driven to nominally the same location on the working plane 110, which includes the reference pattern. In doing so, the fields of view 208, 209 of the two optical modules 106 overlap. The images of the reference pattern captured by the detectors 123 of the optical modules are compared and a correction value is determined for aligning the uncalibrated optical module 106 with the calibrated optical module 106. The correction value may be determined by calculating a phase shift of the reference pattern between the two images (for example, calculated in a manner as described above), the correction based upon the calculated phase shift.

In yet another embodiment, a feature, such as a reference pattern 213, is formed on the working plane 110 using another one of the optical modules 106 or another device, such as a device 124 for projecting a structured light pattern onto the working plane 110. The calibrated and uncalibrated optical modules 106 are controlled as before to move to nominally the same location on the working plane 110 such that the fields of view 211, 212 include the feature/reference pattern and the images captured by the detectors 123 are compared to determine a phase shift of the reference pattern 213 between the two images from which a correction value is determined for the uncalibrated optical module 123.

A first reference pattern 213 may be first be projected on to the working lane 110 within the fields of view 211, 212, the first reference pattern 213 having features that repeat in a first direction, x, and then a second reference pattern may be projected on to the working lane 110 within the fields of view 211, 212, the second reference pattern 213 having features that repeat in a second direction, y, perpendicular to the first direction.

Alternatively, the first and second reference patterns may be projected side by side within the fields of view 211, 212. In yet another embodiment, the detectors 123 of the optical modules 106 are capable of detecting more than one wavelength and the first and second reference patterns are projected onto the same position (or at least overlapping) on the working plane 110 within the fields of view 211, 212 using different wavelength of light. In this way, it is possible to capture information relating to the positioning of the fields of view 211, 211 in more than one axis simultaneously In a further embodiment, the feature, such as a reference artefact, may be a permanent feature of the additive manufacturing apparatus.

Rather than the structured light being projected by a separate device 124, an optical element may be provided in at least one of the optical modules 106 such that the optical module itself can generate the structured light pattern in the working plane 110. The laser beam 118 used to consolidate material may be used to form the structured light pattern or a separate light source may be provided in the optical module 106.

Once the optical modules 106a, 160b, 106c, 106d are calibrated, the optical modules may be used to determine a position of a feature on the working plane 110 through triangulation. For example, a position of a build plate located on the build platform 102 or the build platform 102 may be measured at multiple locations across the working plane and the build plate/build platform levelled based upon the measured positions. A position of one or more preformed parts to be built on using the additive manufacturing apparatus may be measured using the optical modules and the position(s) adjusted based upon the measurements to the desired orientation. A height of the powder bed may be measured using the calibrated optical modules 106.

It will be understood that modification and alterations to the above described embodiments may be made without departing from the scope of the invention as defined herein.

The invention claimed is:

1. A method for determining a correction of beam steering optics of a scanner of an additive manufacturing apparatus comprising a plurality of scanners, each scanner of the plurality of scanners comprising beam steering optics for directing a corresponding radiation beam to a working plane in which a material is consolidated in layers, the method comprising controlling the beam steering optics of a pair of the scanners such that a first scanner of the pair directs a radiation beam to form a feature in the working plane and the feature is within a field of view of a detector of a second scanner of the pair, the detector for detecting radiation coming from the working plane that is collected by the beam steering optics of the second scanner, recording at least one detector value with the detector of the second scanner when the feature falls within the field of view, and determining a correction value for correcting for misalignment in positioning of the radiation beams by the beam steering optics of the first and second scanners from a comparison of a position of the feature in the field of view derived from the at least one detector value with an expected detector position value, the expected position value determined from a positioning of the steering optics of the first scanner of the pair when forming the feature and a positioning of the steering optics of the second scanner of the pair when the at least one detector value is recorded.

2. The method according to claim 1, wherein the feature is a melt pool formed in the working plane by the radiation beam of the first scanner of the pair.

3. A method for determining a correction of beam steering optics of a scanner of an additive manufacturing apparatus comprising a plurality of scanners, each scanner comprising beam steering optics for directing a corresponding radiation beam to a working plane in which a material is consolidated in layers and a detector for detecting radiation coming from the working plane that is collected by the beam steering optics, the method comprising controlling the beam steering optics of first and second scanners of a pair of the scanners such that fields of view of the working plane for the detectors of the first and second scanners at least overlap, recording at least one detector value with the detector of each of the first and second scanners for the corresponding field of view, and determining a correction value for correcting for misalignment in positioning of the radiation beams by the beam steering optics of the first and second scanners from a comparison of
- positions of a feature in the fields of view derived from the detector values recorded by the first and second scanners and
- a positioning of the steering optics of the first and second scanners when the detector values are recorded.

4. The method according to claim 3, wherein the fields of view are nominally coterminous when the detector values are recorded.

5. The method according to claim 3, comprising recording the detector values when a radiation beam is directed onto the material in the working plane within the fields of view by one of the plurality of scanners.

6. The method according to claim 3, comprising recording the detector values based upon the feature within the fields of view formed using one of the radiation beams.

7. The method according to claim 3, comprising recording the detector values based upon a reference pattern located within the fields of view.

8. The method according to claim 7, wherein the reference pattern is one selected from:
   i) formed using one of the radiation beams;
   ii) formed in the working plane using one of the radiation beams by ablating a surface in the working plane or consolidating the material in the working plane; and
   iii) preformed on a reference artefact that is placed in the additive manufacturing apparatus such that the reference pattern is in the fields of view.

9. The method according to claim 7, wherein, the reference pattern comprises at least one periodic feature, the method comprising capturing an image of the reference pattern with the detector of the second scanner, determining from the image a measured periodic property of the reference pattern and determining a correction for control of the first or second scanner based upon a comparison of the measured periodic property with a reference periodic property.

10. The method according to claim 9, wherein the reference periodic property is determined from instructions used to drive the first scanner when forming the reference pattern or a further image of the reference pattern captured by the detector of the first scanner.

11. The method according to claim 3, wherein the correction value is determined by cross-referencing data, including the detector value(s), from the first and second scanners.

12. The method according to claim 11, wherein the correction value is determined from a difference in a measured position of: a spot of at least one of the radiation beams or the feature formed by at least one of the radiation beams within the field of view from a nominal value.

13. The method according to claim 1, comprising adjusting the additive manufacturing apparatus to correct for the misalignment in the positioning of the radiation beams by the beam steering optics of the first and second scanners.

14. The method according to claim 1, wherein the additive manufacturing apparatus comprises more than two scanners and the method is carried out for multiple pairs of the more than two scanners to generate correction values, maps or functions that correct at least one position of the steering optics of one of the scanners of each pair such that the more than two scanners are aligned to a common frame of reference.

15. The method according to claim 3, wherein the additive manufacturing apparatus comprises more than two scanners and the method is carried out for multiple pairs of the more than two scanners to generate correction values, maps or functions that correct at least one position of the steering optics of one of the scanners of each pair such that the more than two scanners are aligned to a common frame of reference.

16. An additive manufacturing apparatus for building up a workpiece in a layer-by-layer manner comprising a plurality of scanners, each scanner for directing a radiation beam to consolidate a material in a working plane in layers and a controller arranged to carry out the method of claim 1.

17. An additive manufacturing apparatus for building up a workpiece in a layer-by-layer manner comprising a plurality of scanners, each scanner for directing a radiation beam to consolidate a material in a working plane in layers and a controller arranged to carry out the method of claim 3.

18. A non-transitory computer readable medium having instructions thereon, which, when executed by a controller for controlling an additive manufacturing apparatus, cause the controller to carry out the method of claim 1.

19. A non-transitory computer readable medium having instructions thereon, which, when executed by a controller for controlling an additive manufacturing apparatus, cause the controller to carry out the method of claim 3.

20. A method for determining a correction of beam steering optics of a scanner of an additive manufacturing apparatus comprising a plurality of scanners, each scanner comprising beam steering optics for directing a corresponding radiation beam to a working plane in which a material is consolidated in layers and a detector for detecting radiation coming from the working plane that is collected by the beam steering optics, the method comprising
- controlling the beam steering optics of a first scanner of the plurality of scanners such that a feature in the working plane is within a field of view of a detector of the first scanner,
- recording at least one detector value with the detector of the first scanner,
- controlling the beam steering optics of a second scanner of the plurality of scanners such that the same feature is within a field of view of a detector of the second scanner,
- recording at least one detector value with the detector of the second scanner, and
- determining a correction value for correcting for misalignment in positioning of the radiation beams by the beam steering optics of the first and second scanners from
  - a position of the feature in the field of view of the detector of the first scanner and a position of the feature in the field of view of the detector of the second scanner derived from the detector values recorded by the first and second scanners and
  - a positioning of the steering optics of the first and second scanners when the detector values are recorded.

21. The method according to claim 20, wherein the feature is a reference pattern in the working plane.

22. The method according to claim 20, comprising placing a reference artefact comprising the feature in the additive manufacturing apparatus such that the same feature is located in the working plane.

23. The method according to claim 20, wherein the feature is a permanent feature of the additive manufacturing apparatus.

24. The method according to claim 1, wherein the feature is a laser spot formed on the working plane by the radiation beam of the first scanner.

25. The method according to claim 5, wherein the feature is a melt pool formed in the working plane by the radiation beam.

26. The method according to claim 5, wherein the feature is a laser spot formed on the working plane by the radiation beam.

27. A method for determining a correction of beam steering optics of a scanner of an additive manufacturing apparatus comprising a plurality of scanners, each scanner comprising beam steering optics for directing a corresponding radiation beam to a working plane in which a material is consolidated in layers, the method comprising controlling the beam steering optics of a first scanner of the plurality of scanners to form at least one of a melt pool and a laser spot in the working plane;

wherein each of a second scanner and a third scanner of the plurality of scanners comprises a detector for detecting radiation coming from the working plane that is collected by the beam steering optics, and the method further comprises:

controlling the beam steering optics of the second and the third scanners such that fields of view of the working plane for the detectors of the second and third scanners at least overlap and include the at least of one of the melt pool and the laser spot, recording at least one detector value with the detector of each of the second and third scanners for the corresponding field of view, and determining a correction value for correcting for misalignment in positioning of the radiation beams by the beam steering optics of the scanners from positions of the at least one of the melt pool or the laser spot in the fields of view derived from the detector values recorded by the second and third scanners.

28. The method according to claim 27, wherein a fourth scanner of the plurality of scanners comprises a detector for detecting radiation coming from the working plane that is collected by the beam steering optics, and the method further comprises:

controlling the beam steering optics of the fourth scanner such that a field of view of the working plane for the detector of the fourth scanner at least partially overlaps with the fields of view of the second and third scanners and includes the at least one of the melt pool and the laser spot, recording at least one detector value with the detector of the fourth scanner for the corresponding field of view, and determining a correction value for correcting for misalignment in positioning of the radiation beams by the beam steering optics of the scanners from positions of the at least one of the melt pool and the laser spot in the fields of view derived from the detector values recorded by the second, third and fourth scanners.

* * * * *